Sept. 26, 1967 G. D. FEHELY 3,343,689
LUMBER PACKAGING UNIT
Filed Jan. 14, 1965 2 Sheets-Sheet 1

GLENN D. FEHELY
INVENTOR.

BY
Townsend and Townsend

Sept. 26, 1967   G. D. FEHELY   3,343,689
LUMBER PACKAGING UNIT
Filed Jan. 14, 1965   2 Sheets-Sheet 2

GLENN D. FEHELY
INVENTOR.

BY
Townsend and Townsend

United States Patent Office 3,343,689
Patented Sept. 26, 1967

3,343,689
LUMBER PACKAGING UNIT
Glenn D. Fehely, Arcata, Calif., assignor to Lumbermatic, Inc., Arcata, Calif., a corporation of California
Filed Jan. 14, 1965, Ser. No. 425,390
12 Claims. (Cl. 214—6)

This invention relates to a packaging unit for boards and similar elongate items capable of being stored in rows and columns. The unit is designed to handle boards, for example, fed to it one at a time and automatically build stacks with them of predetermined size.

The invention is especially advantageous when employed in connection with boards after they have been sorted and graded in a lumber mill. The explanation of the invention will therefore be given in this connection for simplicity although it should be understood that it is contemplated that the apparatus is suitable with other types of items.

In the processing of lumber following sorting and grading the lumber is placed in stacks awaiting shipment and for seasoning. At the present time, the boards are manually placed in such stacks. A great deal of labor is required for this operation which is both costly and slow. The present invention provides apparatus for accomplishing the same result fully automatically and requires no manual labor.

The apparatus is capable of handling boards of varying lengths and building them rapidly into a package. Certain features of the invention to be described more completely provide a way of creating spaces between individual boards in the package as desired. This provides air space which is essential in the drying and proper aging of the sorted and stacked lumber. In addition, the invention provides as a major feature an elevator upon which the stacks of lumber are built. The elevator is of a type that can support heavy loads and lower them at a controlled rate in relation to the gradual build up of layers of lumber on its top. One of the more outstanding aspects of the elevator is the constant balance it can achieve so as to remain level at all times despite the heavy load placed upon it, and which may be significantly greater at one end of the elevator than the other due to the differing lengths of boards which may be used in the make up of the stack or package.

The heart of the unit comprises a frame with a plurality of horizontal parallel forks mounted on it for reciprocal movement. Boards are disposed one at a time transversely across the forks from a loading station at a point along the travel of the forks. Power and control mechanisms are provided to advance the forks a preselected distance after receiving a board and then stop the forks so that the next vacant section on the forks is adjacent the loading section for receiving a subsequent board. This continues until the forks are fully extended and reach their position of maximum advance. An unloading station is located adjacent the position of maximum fork advance. The unit includes a mechanism for discharging the boards on the forks at the unloading station. Unloading is accomplished without disturbing the general relative positions of the boards on the forks. By repeatedly reciprocating the forks with a load of boards and unloading at the point of maximum advance during each cycle a stack of lumber is built.

With reference to the accompanying drawings:

FIG. 1 shows a perspective view of the present packaging unit.

FIGS. 2a, 2b, and 2c are taken along the line of 2—2 of FIG. 1 and show in side section the relative position of the forks and associated parts during loading of the forks, unloading of the forks, and the position at the commencement of a cycle respectively.

Figure 1:
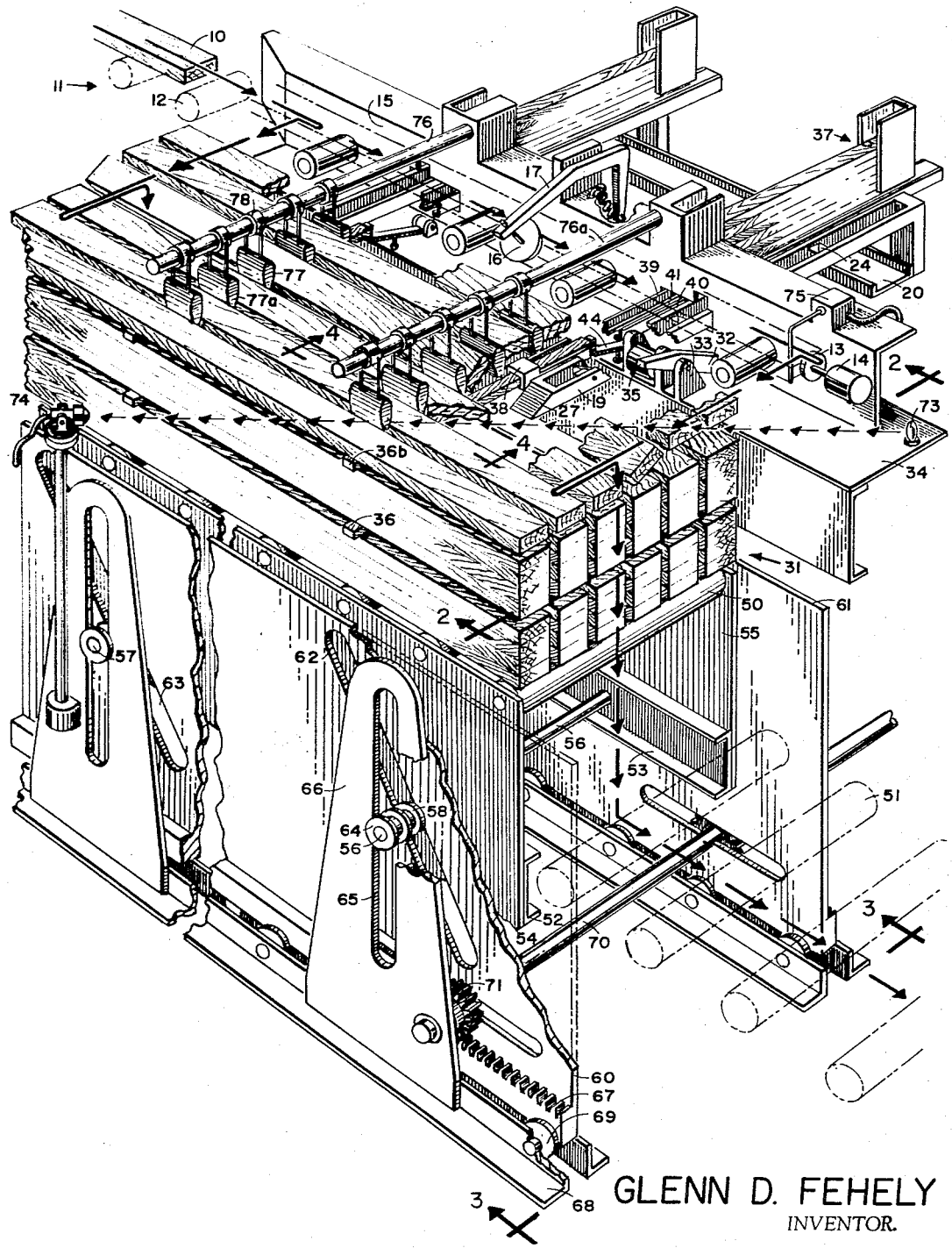

With reference first to FIG. 1, boards or similar items are supplied to the loading station from a a suitable source. They may be fed by hand or come from an automatic supply such as the automatic green chain described in co-pending application, Ser. No. 405,952, filed Oct. 23, 1964. Thus, a board 10 is fed into the machine along a roll case shown generally at 11 comprising a plurality of rollers such as 12 which may be powered or not as required.

Board 10 is moved in the direction of the arrow shown in connection with board 10 until it is stopped by impact with the head of piston 13 in air cylinder 14. (The other arrows in FIGURE 1 define the general path of the boards through the apparatus following this position.) The air pressure in cylinder 14 serves to bring board 10 to a relatively gentle stop without excessive rebound.

Board 10 is aligned in position for pick up by the forks to be described by urging it against a linear guide in the form of wall 15. The board is urged against wall 15 by rotatable half-sphere disc 16. Disc 16 is mounted in an inclined position overhead on arm 17 facing wall 15. A resilient relation between disc 16 and board 10 is achieved by pivotally mounting arm 17 on the top of wall 15 at 17a and anchoring an end of arm 17 with spring 18. Board 10 is contacted by an edge of disc 16 since disc 16 is inclined. Movement of board 10 causes disc 16 to rotate while the resilient pressure from disc 16 causes board 10 to be urged against wall 15 ready for pick-up by the forks. (See FIGURE 2c.) It may also be desirable to have in addition to the disc, an arm over the feeding station positioned to insure that the incoming edge of board 10 is forced under disc or spinner 16. This precaution is advisable where warped or curved boards may be encountered.

When the board is positioned against wall 15 and has been stopped by contact with piston 13 it is picked up by board carrying forks such as fork 19. The number of forks employed will depend on the type of operation and the differences in the lengths of the items such as boards being processed. In conventional lumber processing it is contemplated that five or more forks will be utilized with appropriate spacing to take care of all of the board lengths which may find their way into a single package.

The forks are mounted on a single transverse beam 20 for unitary movement between a starting position at the loading station and a position of maximum advance over the unloading station to be described. Driving beam 20 is suitably conventionally mounted for reciprocation and linked to a drive mechanism such as a drive chain 21 which derives power from a motor 22 through suitable linkages which may include a clutch and shift assembly 23.

The forks on beam 20 are moved forward in an intermittent fashion. They are stopped so as to receive an incoming board from the roll case. After a board is disposed on the forks, the forks are moved forward to be in a position to receive a subsequent board and again stopped. Boards which have been fed onto and disposed transversely across the forks are moved forward in positive non-slipping relation to the forks by a plurality of pusher dogs 24. (See FIGURE 4.) Pusher dogs 24 are disposed along each fork 19 so as to leave a space between dogs large enough for the widest board being processed. (See FIGURE 2a.) Dogs 24 are disposed in parallel rows across the several forks which may be driven on beam 19.

Figures 4, 5:
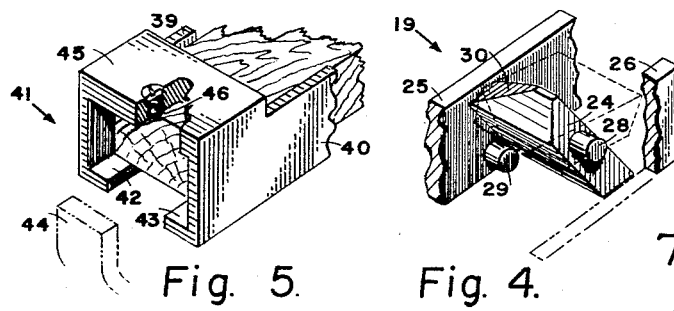
FIG. 4 is a perspective detail of one of the load carrying forks in the vicinity of a pusher dog, and taken along the line 4—4 of FIG. 1.
FIG. 5 is a perspective view of the discharge end of one of the stick carriers and shows the relation of the ejector for stocks from the carrier.

With reference especially to FIGURE 4, fork 19 comprises a pair of side walls 25 and 26 joined with a solid chisel front end 27 best seen in FIGURE 1. In the space between the side walls 25 and 26 dog 24 is pivotally mounted on a pin 28 so that dog 24 normally is in an upright position with a portion extending above the top of side walls 25 and 26. Dog 24 can be pivoted downwardly flush with the top surface of walls 25 and 26 by rotating about pin 28 as shown in the dotted lines in FIG. 4. A stop 29 is suitably provided to prevent dog 24 from rotating below this flush position with the side walls to insure that it will return to the upright position when released.

The top of dog 24 is beveled at 30. Beveled area 30 faces the direction from which the incoming boards enter the unit. This permits a board to be loaded across the forks during the return stroke of the forks following their unloading. The incoming board will engage the beveled area 27 and depress the dogs into the space between walls 25 and 26 and thereby ride across the forks without obstruction.

Figure 2A:
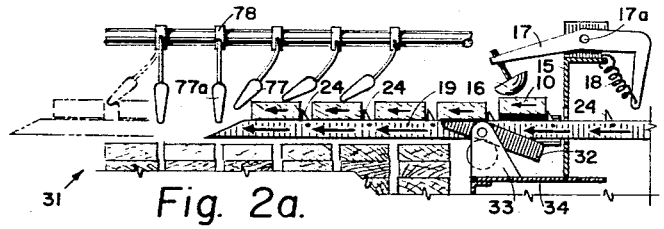
Figure 2B:
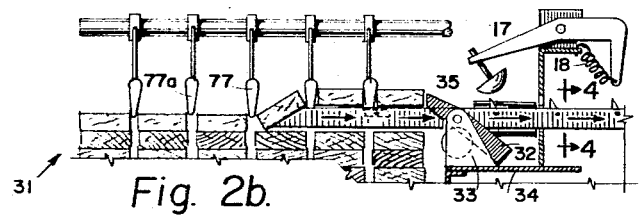
Figure 2C:
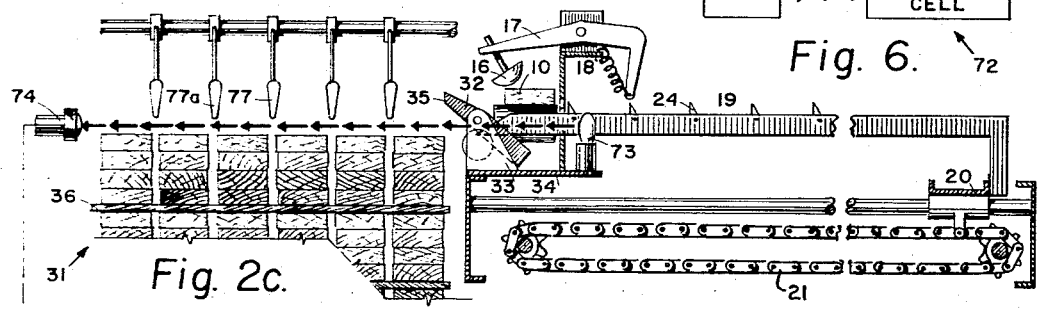

In the forward stroke of the forks, dogs 24 are in their upright position as seen in FIGS. 2a–2c whereby they engage the trailing edge of the boards and positively advance the boards along with the forks. The forks proceed stepwise as mentioned above until all of the spaces between dogs 24 are filled with incoming boards at which time the forks reach their position of maximum advance over the unloading station shown generally at 31. At this point the forks are retracted. With the cooperation of a series of unloading dogs mounted on shelf 34 parallel to roll case 11, such as dog 32, the boards are stripped from the top of the forks and allowed to fall onto unloading station 31. During the retraction, pusher dogs 24 are depressed into the channel in the forks by contact with the leading edges and under side of the boards. (See FIGURE 2b.)

Figure 3:
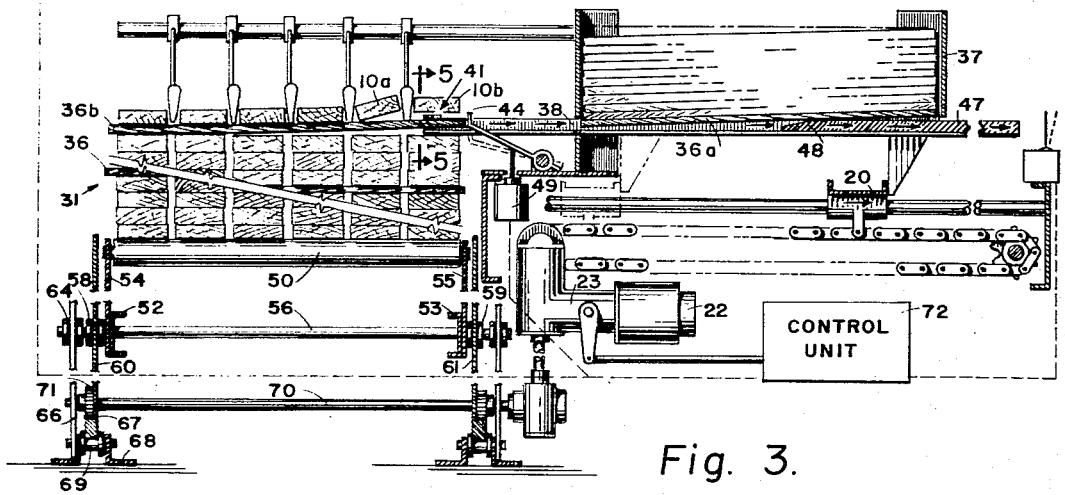
FIG. 3 is taken along the line 3—3 of FIG. 1 and shows in end section the elevator portion of the unloading section together with the operation of the stick carriers for spacing layers of lumber.

Unloading dogs such as dog 32 are similar in structure and operation to pusher dogs 24. Thus, unloading dog 32 is pivotally mounted in a bracket 33 on shelf 34 so that the normal position for the contact end 35 of unloading dog 32 is at the level of the boards present on forks 19. During the withdrawal of the forks from their position of maximum advance as shown in FIGS. 2b and 3 unloading dog 32 engages the trailing edge of the last board on the forks. This in turn prevents all of the boards from returning with the forks since they are all in the same plane. Unloading dog 32 is depressed beneath the surface of the boards during the advance of the forks as shown in FIG. 2a.

Vertical spacing between layers of boards on unload-station 31 is accomplished by inserting sticks such as stick 36 transversely across selected layers of the boards. Sticks are provided from a plurality of hoppers such as hopper 37 and carried to the unloading station in elongate stick carriers such as carrier 38. Stick carriers such as carrier 38 are mounted on drive beam 20 for unitary reciprocation with the board carrying forks 19. The stick carriers are constructed so that when they are in the fully retracted position underneath hopper 37 a stick 36a will drop into a space between side walls 39 and 40 through an open area 41 in the top. (See FIGURE 3.) The bottom of stick carrier 38 is formed with lips 42 and 43 (see FIGURE 5) extending only part way between side walls 39 and 40 to hold a stick in the carrier while leaving an entrance for ejector 44. The front end of carrier 38 is bridged over at 45 and contains a spring mounted bearing 46 therein to retain sticks in the carrier until the appropriate moment for their discharge.

The stick carrier 38 has a solid bottom portion at the rear as shown at 47 in FIG. 3 behind the open bottom portion formed by lips 42 and 43. The solid portion 47 of the bottom of carrier 38 tapers downwardly as shown at 48. The tapered solid portion is necessary for smooth operation during reciprocation when no sticks are ejected onto the unloading station. In this event, during the next reciprocation it is important not to strip another stick from the hopper 37. The tapered portion 48 permits the carrier 38 which still contains a stick from the last cycle to ride smoothly under the bottom stick in the hopper 37.

During those cycles where it is desired to insert a stick to create a space between layers of boards (this could be done between each layer or between only certain layers through the use of a suitable control cycle to be described), a signal from a control unit to be described is given to solenoid 49 which raises stick stripping lever or ejector 44 into the channel formed between the lower lips 42 and 43 of stick carrier 38 behind the trailing edge of the stick in the carrier. At this point the carrier is positioned over the unloading station with the various parts positioned as shown in FIGS. 1 and 3. During subsequent withdrawal of the driving beam 20 together with board carrying forks 19 and stick carriers 38 the stick 36b which had been in the stick carrier 38 is ejected and remains on the unloading station 31. When the stick carrier 38 is fully withdrawn the stick 36b will fall into position on top of the upper layer of boards on the unloading station with boards such as 10a and 10b being discharged simultaneously from forks 19 on top of the stick.

Unloadng station 31 comprises a suitable elevator for gradually lowering as each layer of boards is placed thereon. In the preferred embodiment the elevator comprises a board receiving platform formed with a plurality of rollers 50 to facilitate unloading of the completed package. When in the lowest position the rollers 50 will be in the same plane as outgoing roll case 51 and the package can be simply rolled off the top of the elevator and onto the outgoing roll case.

Rollers 50 are joined to a frame comprising channels 52 and 53 and side walls 54 and 55. Shafts 56 and 57 are horizontal and parallel and lie in the same plane and join side walls 54 and 55. At each end of each shaft 56 and 57 are flanged wheels such as 58 on shaft 56 mounted for rotation about the shaft. A pair of vertical plates 60 and 61 contain inclined slots such as 62 and 63 in plate 60. As illustrated, the slots are of the same slope so that the elevator will be level at all times. The slots in plate 61 (not shown) are parallel and correspond to slots 62 and 63 for level support of wall 55. Flanged wheels such as wheel 58 are disposed to ride in slot 62 of vertical plate 60. At the other end of shaft 56 flanged wheel 59 rides in a corresponding slot in plate 61. The other shaft 57 also has a set of flanged wheels for engagement with the other slots in plates 60 and 61. At least one shaft such as shaft 56 has at least one second flanged wheel 64 rotatably mounted thereon. It engages a vertical slot 65 in guide plate 66. Wheel 64 follows slot 65 and thereby permits only vertical movement of shafts 56 and 57. If further automation is desired a motor may be mounted on the elevator for driving rollers 50 together with a suitable switch that is contacted to actuate the motor when the elevator is in the lowest position. This will thereby automatically move the lumber package onto the outgoing roll case 51 at the appropriate time.

Plates such as plate 60 have a rack 67 mounted on the lower margin thereof. The entire plate 60 is mounted on a track 68 having rollers 69 so that the plate may slide laterally. Plate 61 is similarly mounted. A shaft 70 having a pinion 71 at each end is driven from a power source such as motor 22. By turning shaft 70 power is transmitted through the rack and pinion to cause plates 60 and 61 to slide. This in turn forces flanged wheels such as 58 and 59 to ride on the inclined surface of their associated slots. Since the shafts are restricted to vertical movement by vertical slot 65 they can move only up and down. This causes the shafts and in turn the entire elevator frame including the board receiving surfaces and rollers 50 to move up and down depending on the direction in which vertical plates are driven by shaft 70.

It is desired to have the top of the load on rollers 50 at a constant height for receiving boards from the board carrying forks 19. In the preferred embodiment this is accomplished through a photoelectric cell and circuitry suitably linked through a control unit 72 to establish power input from motor 22 to shaft 70. The unit is designed to operate in the sequence to be described.

Figure 6:
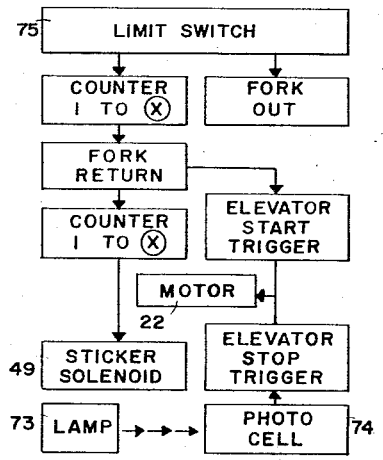
FIG. 6 is a schematic diagram showing the timing cycle for the movement of the various parts of the machine.

With reference to FIG. 6 the timing sequence supplied by control unit 72 is as follows. When a board strikes the limit switch 75 in the vicinity of piston 13 a signal is transmitted through the control unit to move the driving beam 20 so that the forks are moved a preset distance to place the next adjacent space between pushed dogs 24 in the path of the next incoming board on the roll case. A counter for actuations of limit switch 75 is set in relation to the number of board receiving spaces between pusher dogs along a fork 19. When the given number has been reached by the counter corresponding to a full fork load, a signal is given through control unit 72 to clutch and shift assembly 23 and the fork driving chains are reversed for the return of the forks.

Each return of the forks triggers the actuation of motor 22 to transmit power to shaft 70 of the elevator to move it downwardly. Downward movement continues while the light beam from lamp 73 to photoaelectric cell 74 is broken by boards or sticks which lie in its path. When the beam again reaches cell 74 the transmission of power to shaft 70 is stopped by actuation of a stop trigger through a signal from cell 74. When elevator 50 reaches the lowest position and the load is removed, the elevator is raised to the top to begin a new load by reversing the direction of rotation of shaft 70. Preferably this is accomplished automatically through a switch in the surface of the elevator that is released in the absence of a load. Another alternative for such automation is to mount a switch in the surface of outgoing roll case 51 at a position such that a lumber package being removed has cleared the elevator at the time it engages the switch in roll case 51. Contact of the switch in roll case 51 may be suitably placed in the control circuit to cause the elevator to rise when contacted.

On the return stroke of beam 20, another counter registers each movement and is set to actuate sticked solenoids 49 after a given number of returns of the fork corresponding to the number of layers of boards desired between sticks. Solenoid 49 is actuated as the forks and stick carriers next approach the position of maximum advance.

Horizontal spacing between boards in a given layer is obtained as follows. A pair of horizontal rods such as 76 and 76a (or as many as required depending on the length of the boards) are attached to wall 15 so that their outer extremities lie over elevator 50. Supported from each rod such as rod 76 are a plurality of flexible spacers such as 77, 77a by means of sleeves such as 78 which fit around rod 76. Each spacer 77 can thus be adjusted in position over elevator 50 as required by sliding sleeve 78 along rod 76.

As the forks 19 with boards thereon are advanced to the position of maximum advance they pass under the depending spacers 77 and 77a as best seen in FIG. 2a. The passage of the boards is permitted by virtue of the flexible nature of the spacers 77 and 77a. When the boards reach the position over the elevator 50 to be dropped off forks 19 during the retraction thereof, spacers 77 and 77a extend between the boards as best seen in FIG. 2b. This prevents the board from being pushed together to close up the lateral spaces therebetween during the retraction of the forks 19. When the elevator 50 is lowered as shown in FIG. 2c the boards are lowered beneath the lowermost reaches of the depending spacers 77 and 77a which are then in position to space the next fork load of boards. Where lateral spacing between boards is not desired the spacers such as 77 and 77a can be rotated upwardly out of position about rod 76.

Several safety features are desirably built into the unit which may include a switch to automatically shut down the unit at the point that elevator 50 reaches the lowermost position and the stack of lumber thereon is not removed onto outgoing roll case 51. As soon as the lumber is removed onto outgoing roll case 51 the safety switch is automatically released to permit continued operation of the unit. The switch may be built into the surface of elevator 50 under the load to be carried.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A packaging unit for boards and the like comprising: a frame; a plurality of horizontal parallel forks mounted for reciprocal movement on said frame between a starting position and a position of maximum advance; a loading station adjacent said forks including means for feeding boards sequentially across the top of said forks; said forks having side walls defining a central channel therebetween; pusherdogs pivotally mounted on said forks within said channel; means for advancing said forks a preselected distance after receiving a board and then stopping said forks, so that a vacant section on said forks is adjacent said loading station; said dogs being spaced along each fork to permit a board to fit therebetween and lying in parallel transverse rows across the several forks; each dog normally positioned with a portion extending above the surface of its fork to engage the trailing edge of an adjacent board that has been fed onto the forks, thereby positively advancing the board with the advance of said fork; said pusherdogs being pivotally flush with the surface of said forks by contact with boards during said return movement of said forks; an unloading station adjacent the point of maximum advance of said fork; means for discharging all of the boards so loaded on said forks together at an unloading station while retaining their general relative positions after the forks return from the position of maximum advance.

2. A packaging unit in accordance with claim 1 and wherein: a portion of each pusherdog that extends above the forks is sloped on the side facing the loading station whereby a board being fed transversely onto said forks over one of said pusherdogs will pivotally depress said one of said pusherdogs at said sloped portion.

3. A packaging unit in accordance with claim 1 and including: a plurality of elongate stick carriers mounted with said forks for unitary reciprocal movement therewith; means for ejecting sticks from said carriers transversely across said unloading station after a preselected number of advances of said forks, whereby said sticks establish vertical spacing between board layers on said unloading station.

4. A packaging unit in accordance with claim 1 and wherein: a plurality of spacing fingers are mounted over said unloading station at the position of maximum fork advance; said spacing fingers mounted to extend between said boards at said position of maximum advance; said fingers resiliently mounted to by-pass said boards during said fork advance.

5. A packaging unit in accordance with claim 1 and wherein said unloading station comprises: an elevator frame; a horizontal board receiving surface mounted on said frame; a plurality of parallel horizontal shafts supporting said frame; pairs of guide wheels rotatably mounted at the ends of said horizontal shafts; each pair of guide wheels comprising first and second guide wheels;

a pair of vertical plates mounted at either end of said shafts approximately normal to said shafts and adjacent said first guide wheels; each of said plates defining a plurality of parallel inclined edges disposed transversely to said shafts; said first guide wheels engaging said inclined edges; a pair of vertical guide members mounted at either end of said shafts approximately normal to said shafts; said guide members engaging said second guide wheels thereby restricting said shafts to vertical movement with respect to said guide members; means for horizontally moving said vertical plates in unison relative to said guide members; said means for horizontally moving said vertical guide plates responsive to the height of said load on said board receiving surface whereby said shaft is moved vertically along said vertical guide members as said vertical plates are moved.

6. A packaging unit in accordance with claim 5 and wherein the means for horizontally sliding comprises: a horizontal rack attached to at least one of said plates; a pair of tracks; means for slidably mounting said plates on said tracks for movement in unison; a shaft including a pinion gear engaging said rack; means for rotating said shaft.

7. In a mechanical loader for loading boards and the like wherein articles to be loaded are received sequentially from a loading station, disposed upon a loading apparatus in sequence, and dispersed from the loading apparatus at an unloading station in layers maintaining their general relative position on said loading apparatus, the combination of a loading apparatus comprising: a frame; a plurality of horizontal parallel forks mounted for reciprocal movement on said frame between a starting position and a position of maximum advance; a plurality of elongate stick carriers mounted with said forks for unitary reciprocal movement therewith; means for ejecting sticks from said carriers transversing across said unloading station after a preselected number of advances of said forks, whereby said sticks establish vertical spacing between article layers on said unloading station.

8. In a mechanical loader for boards and the like according to claim 7 and wherein said means for ejecting sticks from said carrier comprises: a pivotally mounted ejector; said ejector engaging said sticks in said carrier at said position of maximum advance after a preselected number of advances of said forks; said stick being ejected immediately under said articles as said forks retract.

9. In a mechanical loader for loading boards and the like wherein articles to be loaded are received sequentially from a loading station, disposed upon a loading apparatus in sequence, and dispersed from the loading apparatus at an unloading station in layers maintaining their general relative position on said loading apparatus, the combination of a loading apparatus comprising: a frame; a loading surface mounted for reciprocal movement on said frame between a starting position adjacent said loading station and a position of maximum advance immediately overlying said unloading station; means for distributing said articles with successive vacant sections between said articles on said unloading station; a plurality of spacing fingers mounted over said unloading station at the position of maximum load surface advance; said spacing fingers mounted to extend between said articles and said position of maximum advance; said fingers resiliently mounted to permit said boards to by-pass said fingers during said loading surface advance.

10. An elevator adapted for balancing heavy loads at irregularly selected elevations, said elevator comprising: an elevator frame; a horizontal surface mounted on said frame; a plurality of parallel horizontal shafts supporting said frame; pairs of guide wheels rotatably mounted at the ends of one of said horizontal shafts; each pair of guide wheels comprising first and second guide wheels; second guide wheels rotatably mounted at the ends of the remaining horizontal shafts; a pair of vertical plates mounted at either end of said shafts approximately normal to said shafts and adjacent said first guide wheels; each of said plates defining a plurality of parallel inclined edges disposed transversely to said shafts; said first guide wheels engaging said inclined edges; a pair of vertical guide members mounted at either end of one of said shafts approximately normal to said shafts; said guide members engaging said second guide wheels thereby restricting said shafts to vertical movement with respect to said guide members; means for horizontally moving said vertical plates in unison relative to said guide members, whereby said horizontal surface is vertically adjustable.

11. An elevator according to claim 10 and wherein the means for horizontally sliding comprises: a horizontal rack attached to at least one of said plates; a pair of tracks; means for slidably mounting said plates on said tracks for movement in unison; a shaft including a pinion gear engaging said rack; means for rotating said shaft.

12. A loading unit for the sequential dispensing of boards and the like comprising: a roll case extending lengthwise in the direction of the desired sequential dispensing; a linear guide along said roll case extending in said direction of sequential dispensing; a rotatable half-sphere mounted over said roll case for contact with the top of a board sequentially dispensed on said roll case, said half-sphere rotatable about an axis inclined downwardly toward said roll case and linear guide, said half-sphere pivotally urging said boards in the approximate direction of said axis, whereby said sequentially dispensed board is impelled against said linear guide.

References Cited

UNITED STATES PATENTS

| | | | |
|---|---|---|---|
| 864,722 | 8/1907 | Beebe | 214—6 |
| 983,892 | 2/1911 | Graham | 214—6 |
| 2,397,720 | 4/1946 | Beane | 214—6 |
| 2,401,592 | 6/1946 | Von Stocker | 214—6 |
| 2,467,113 | 4/1949 | Deiters | 214—6 |
| 2,472,225 | 6/1949 | Muddiman | 214—6 |
| 2,813,638 | 11/1957 | Miller | 214—6 |
| 2,861,702 | 11/1958 | Mason | 214—6 |
| 2,895,624 | 7/1959 | Oster | 214—6 |
| 2,998,147 | 8/1961 | Rysti | 214—6 |
| 3,169,646 | 2/1965 | Mason | 214—6 |

GERALD M. FORLENZA, *Primary Examiner.*

J. E. OLDS, *Assistant Examiner.*